UNITED STATES PATENT OFFICE.

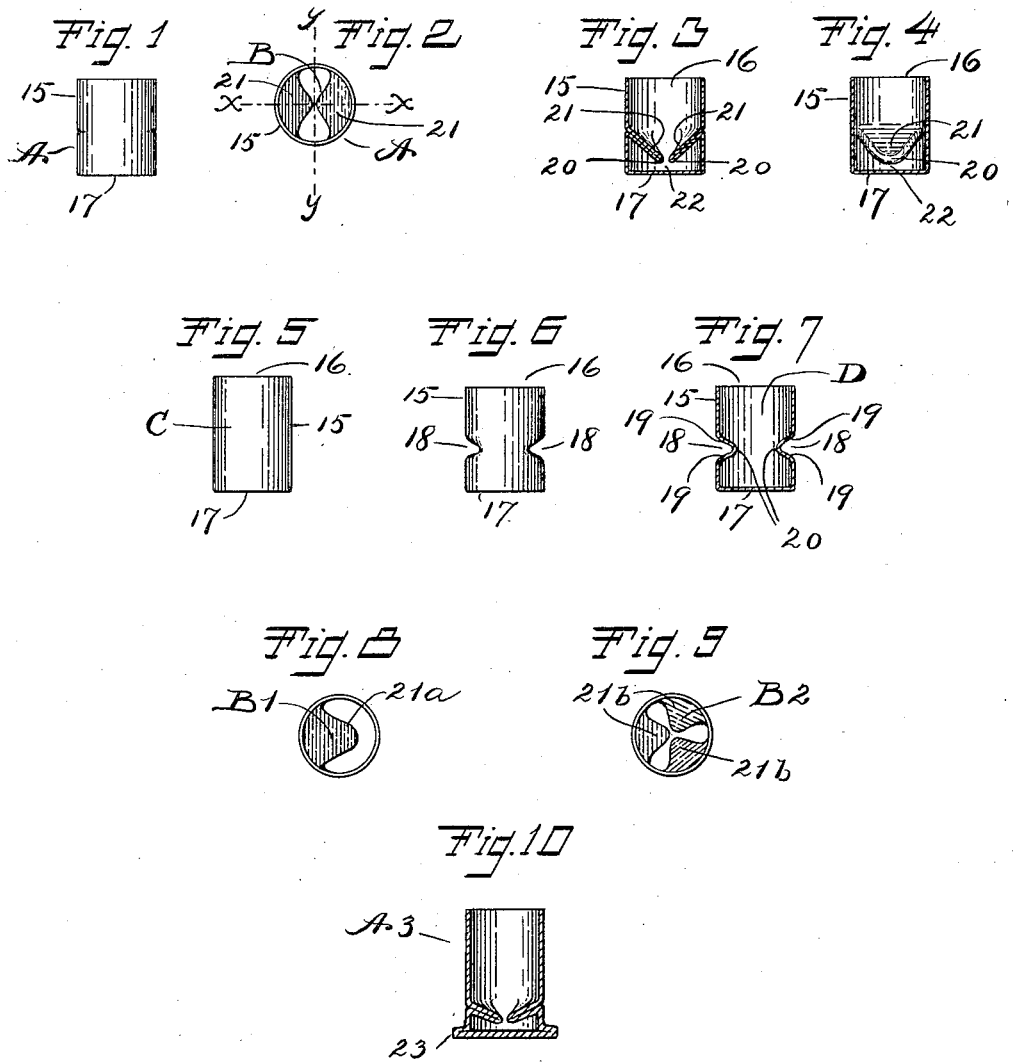

CHARLES A. BAILEY, OF CROMWELL, CONNECTICUT.

PRIMER.

1,060,965.　　Specification of Letters Patent.　　Patented May 6, 1913.

Application filed June 12, 1912. Serial No. 703,358.

*To all whom it may concern:*

Be it known that I, CHARLES A. BAILEY, a citizen of the United States, residing at Cromwell, in the county of Middlesex and State of Connecticut, have invented certain new and useful Improvements in Primers, of which the following is a specification.

My invention relates to improvements in primers, and the object of my improvement is to produce a primer having certain advantages as applied to the anvil.

In the accompanying drawing:—Figure 1 is a side elevation of my improved primer. Fig. 2 is a plan view of the same. Fig. 3 is a sectional view on the line $x$ $x$ of Fig. 2. Fig. 4 is a sectional view on the line $y$ $y$ of Fig. 2. Fig. 5 is a side elevation of the primer shown in Fig. 1 previously to being operated on to provide an anvil. Fig. 6 is a similar view of the same after having the side indented. Fig. 7 is a sectional view of the same on the line $x$ $x$ of Fig. 2. Figs. 8 and 9 are plan views of two modifications of my primer. Fig. 10 is a sectional view of a primer of a different style embodying my invention.

My primer A is cup shaped and is provided on the interior with an anvil B formed in a manner to be described, and is made of sheet metal. The strictly cup shaped blank C shown in Fig. 5 may be made in any manner desired and comprises a strictly cylindrical side wall 15, having an open inner end 16 and has an end wall 17 that closes the outer end, and the first operation of my process is to indent the said side wall 15 as shown at 18 at as many points as desired, shown in Figs. 6 and 7 as two in number. The indentations 18 extend appreciably inward into the interior space D within the side wall 15. In the next operation the indentations 18 are operated on by a plunger operating in the said interior space D which fits the interior and by a longitudinal movement compresses the material forming the indentations 18 toward the end wall 17, bringing the opposing walls 19 into abutment and projecting the apex 20 inward into the said interior space D, whereby the said indentations 18 are transformed each into a fan shaped inwardly projecting wing or tongue 21 comprising a return bend of the material of the side wall 15, as shown in Figs. 3 and 4, and the apex 20 will be in the form of an approximately sharp point. I prefer to have the said wing 21 inclined as shown in Fig. 4, so that the tip or point 20 at the apex will be directed toward the base or end wall 17 and separated therefrom by a very small space 22. The wings 21 formed as described are suitable for use as anvil members and one alone may be sufficient to constitute an operative anvil, though I prefer to use two as shown in Figs. 1, 2, 3 and 4.

In the modification shown in Fig. 8 the anvil $B^1$ comprises a single wing $21^a$ and in the modification shown in Fig. 9 the anvil $B^2$ comprises three wings $21^b$.

In Fig. 10 is shown a primer $A^3$ which differs from that shown in Fig. 1 in having an enlarged head 23 at the lower end.

As described, my primer comprises a cylindrical side wall and an anvil composed of members formed integral with the said side wall, and the said anvil is formed of a double thickness of the material of the said cylindrical side wall.

I claim as my invention:—

1. A primer comprising a cylindrical side wall having an indentation in the said side wall the material of the said indentation being compressed together so as to provide an anvil member extending inwardly into the interior space inclosed by the said side wall.

2. A primer comprising a cylindrical side wall and an anvil inclosed by the said side wall and the said anvil composed of a double thickness of the material of the said side wall.

CHARLES A. BAILEY.

Witnesses:
　SHEFFIELD H. CLARKE,
　ROGER EDWARDS.

---

Copies of this patent may be obtained for five cents each, by addressing the "Commissioner of Patents, Washington, D. C."